US011842433B2

(12) United States Patent
Mashrabov et al.

(10) Patent No.: US 11,842,433 B2
(45) Date of Patent: Dec. 12, 2023

(54) GENERATING PERSONALIZED VIDEOS WITH CUSTOMIZED TEXT MESSAGES

(71) Applicant: Snap Inc., Santa Monica, CA (US)

(72) Inventors: Alexander Mashrabov, Sochi (RU); Victor Shaburov, Ocean Village (GI); Sofia Savinova, Sochi (RU); Dmitriy Matov, Saratov (RU); Andrew Osipov, Moscow (RU); Ivan Semenov, Astrakhan (RU); Roman Golobokov, Sochi (RU)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/697,559

(22) Filed: Mar. 17, 2022

(65) Prior Publication Data

US 2022/0207812 A1 Jun. 30, 2022

Related U.S. Application Data

(63) Continuation of application No. 16/661,122, filed on Oct. 23, 2019, now Pat. No. 11,308,677, which is a continuation-in-part of application No. 16/594,690, filed on Oct. 7, 2019, now Pat. No. 11,089,238, and a continuation-in-part of application No. 16/594,771, filed on Oct. 7, 2019, now Pat. No. 11,394,888, and a continuation-in-part of application No. 16/551,756, filed on Aug. 27, 2019, now Pat. No. 10,776,981, (Continued)

(51) Int. Cl.
*G06T 13/80* (2011.01)
*H04L 51/04* (2022.01)
*G11B 27/031* (2006.01)
*H04L 51/10* (2022.01)
*H04M 1/72439* (2021.01)

(52) U.S. Cl.
CPC ............ *G06T 13/80* (2013.01); *G11B 27/031* (2013.01); *H04L 51/04* (2013.01); *H04L 51/10* (2013.01); *H04M 1/72439* (2021.01)

(58) Field of Classification Search
CPC .. G06K 9/00228; G06K 9/00302; G06N 3/04; G06Q 30/0254; G06Q 30/0269; G06T 11/001; G06T 11/60; G06T 13/80; H04M 1/72403; H04M 1/72439; H04M 2250/52
See application file for complete search history.

(56) References Cited

U.S. PATENT DOCUMENTS

2017/0004646 A1* 1/2017 Phillipps ................. G06T 13/80

* cited by examiner

*Primary Examiner* — Ruiping Li
(74) *Attorney, Agent, or Firm* — Georgiy L. Khayet

(57) ABSTRACT

Described are systems and methods for generating personalized videos with customized text messages. An example method commences with receiving an input text and a video template. The video template includes a sequence of frame images and text parameters defining an animation of the input text for the sequence of frame images. The method continues with rendering an output video. The output video includes the sequence of frame images featuring the input text rendered according to the text parameters. The method further includes providing a user with an option to change at least one text parameter of the text parameters. The method continues with dynamically changing, by the at least one computing resource, the input text according to the at least one text parameter. The method further includes providing, by the at least one computing resource, the output video to at least one further computing resource via a communication chat.

20 Claims, 10 Drawing Sheets

Related U.S. Application Data which is a continuation-in-part of application No. 16/434,185, filed on Jun. 7, 2019, now Pat. No. 10,839,586, said application No. 16/594,690 is a continuation-in-part of application No. 16/251,436, filed on Jan. 18, 2019, now Pat. No. 10,789,453, said application No. 16/661,122 is a continuation-in-part of application No. 16/251,472, filed on Jan. 18, 2019, now Pat. No. 11,049,310, said application No. 16/594,771 is a continuation-in-part of application No. 16/251,436, filed on Jan. 18, 2019, now Pat. No. 10,789,453.

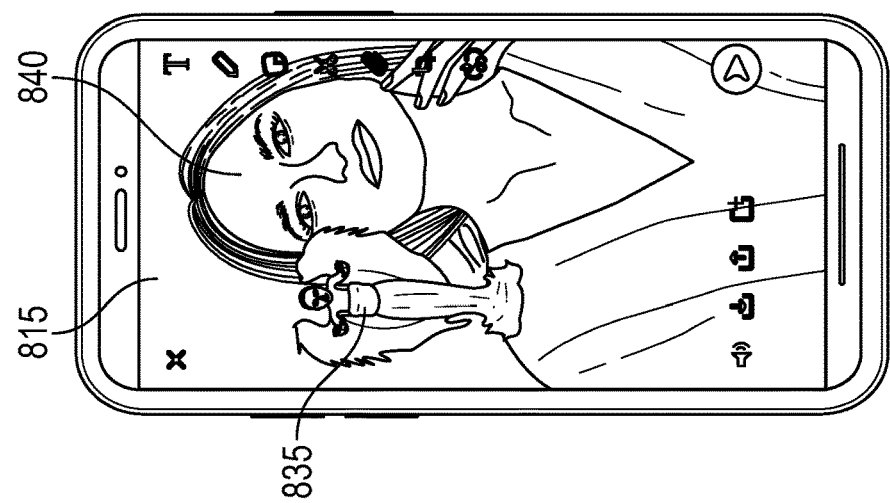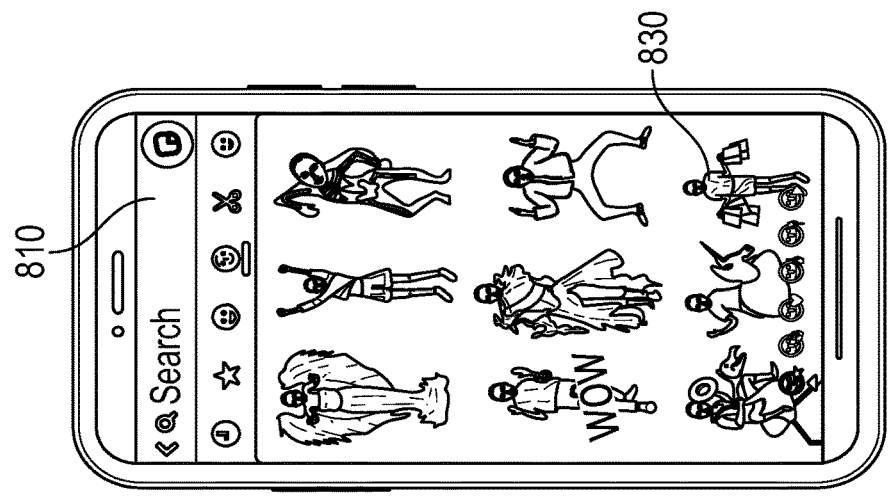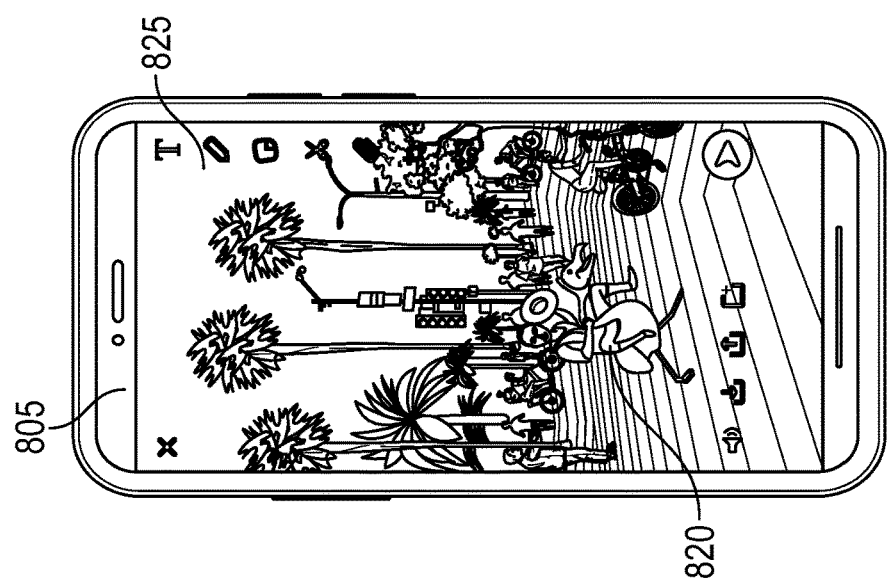
FIG. 8

GENERATING PERSONALIZED VIDEOS WITH CUSTOMIZED TEXT MESSAGES

CROSS-REFERENCE TO RELATED APPLICATION

This application is a Continuation of and claims the priority benefit of U.S. patent application Ser. No. 16/661,122, entitled "Generating Personalized Videos with Customized Text Messages," filed on Oct. 23, 2019, which in turn is a Continuation-in-part of U.S. application Ser. No. 16/594,771, entitled "Systems and Methods for Providing Personalized Videos", filed on Oct. 7, 2019, which is a Continuation-in-part of U.S. patent application Ser. No. 16/251,436, entitled "Systems and Methods for Face Reenactment," filed on Jan. 18, 2019, a U.S. application Ser. No. 16/594,690, entitled "Systems and Methods for Providing Personalized Videos Featuring Multiple Persons", filed on Oct. 7, 2019, which is a Continuation-in-part of U.S. patent application Ser. No. 16/251,436, entitled "Systems and Methods for Face Reenactment," filed on Jan. 18, 2019, a Continuation-in-Part of U.S. patent application Ser. No. 16/251,472, entitled "Systems and Methods for Photorealistic Real-Time Portrait Animation," filed on Jan. 18, 2019, and U.S. patent application Ser. No. 16/551,756, entitled "Entertaining Mobile Application for Animating a Single Image of a Human Body and Applying Effects," filed on Aug. 27, 2019, which is a Continuation-in-part of U.S. patent application No. 16/434,185, entitled "Single Image-Based Real-Time Body Animation", filed on Jun. 7, 2019. The present application is related to U.S. application Ser. No. 16/661,086, titled "Systems and Methods for Template-Based Generation of Personalized Videos", filed on Oct. 23, 2019. The aforementioned applications are incorporated herein by reference in their entirety for all purposes.

TECHNICAL FIELD

This disclosure generally relates to digital image processing. More particularly, this disclosure relates to methods and systems for generating personalized videos with customized text messages.

BACKGROUND

Sharing media, such as stickers and emojis, has become a standard option in messaging applications (also referred herein to as messengers). Currently, some of the messengers provide users with an option for generating and sending images and short videos to other users via a communication chat. Certain existing messengers allow users to modify the short videos prior to transmission. However, the modifications of the short videos provided by the existing messengers are limited to visualization effects, filters, and texts. The users of the current messengers cannot perform complex editing, such as, for example, replace one face with another face. Such editing of the videos is not provided by current messengers and requires sophisticated third-party video editing software.

BRIEF DESCRIPTION OF THE DRAWINGS

Embodiments are illustrated by way of example and not limitation in the figures of the accompanying drawings, in which like references indicate similar elements.

FIG. 8 shows example frames of a personalized video generated based on a user image, according to an example embodiment.

DETAILED DESCRIPTION

Figure 1:
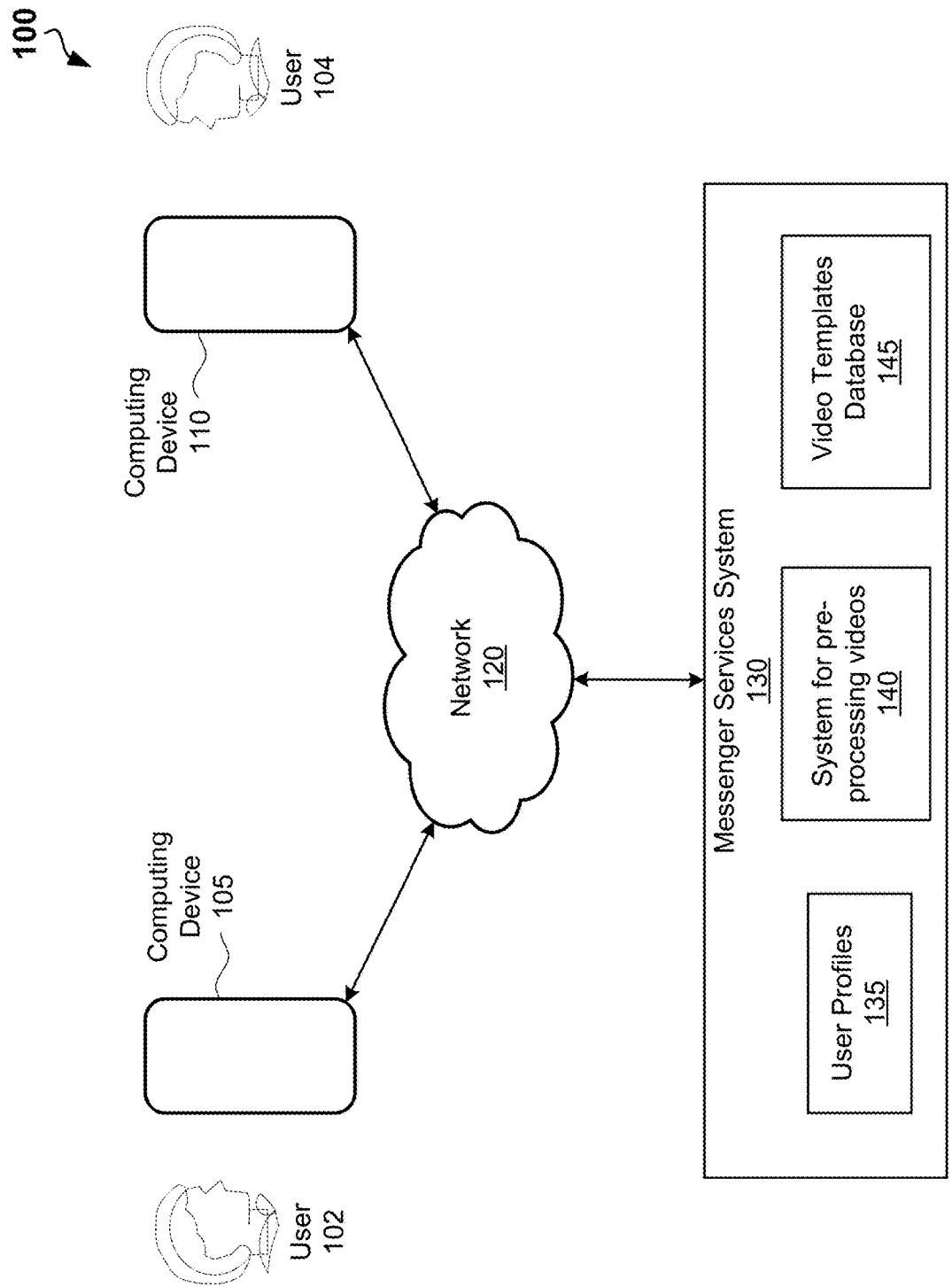
FIG. 1 is a block diagram showing an example environment wherein systems and methods for generating personalized videos with customized text messages can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

This disclosure relates to methods and systems for generating personalized videos with customized text messages. The embodiments provided in this disclosure solve at least some issues of known art. The present disclosure can be designed to work on mobile devices, such as smartphones, tablet computers, or mobile phones, in real-time, although the embodiments can be extended to approaches involving a web service or a cloud-based resource. Methods described herein can be implemented by software running on a computer system or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium.

Some embodiments of the disclosure may allow generating personalized videos in a real time on a user computing device, such as a smartphone. The personalized videos can be generated based on pre-generated video templates. A video template may include a sequence of frame images and preset text parameters for an animation of a text. The video template may also include a sequence of face area parameters defining positions of a face area in the frame images and a sequence of facial landmark parameters defining positions of facial landmarks in the frame images. Each of the facial landmark parameters may correspond to a facial expression. The frame images can be generated based on an animation video or a live action video. The facial landmark parameters can be generated based on another live action video featuring a face of an actor (also called a face synchronization (facesync) as described in more detail below), animation video, an audio file, text, or manually. The video template may include a sequence of animated object images. The video template may also include a soundtrack. As used herein, a facesync actor is a person whose facial landmark parameters are used, an actor is another person whose body is used in a video template and whose skin may be recolored, and a user is a person who takes an image of his face to generate a personalized video. Thus, in some embodiments, the personalized video includes the face of the user modified to have facial expressions of the facesync actor and includes a body of the actor taken from the video template and recolored to match with the color of the face of the user.

The pre-generated video templates can be stored remotely in a cloud-based computing resource and can be downloadable by a user of a computing device (such as a smartphone). The user of the computing device may capture, by the computing device, an image of a face or select an image of the face from a camera roll. The computing device may further generate, based on the image of the face and one of the pre-generated video templates, a personalized video. The personalized video may feature the face adopting facial expression corresponding to facial landmark parameters associated with a facesync actor in the pre-generated video template.

The computing device may further add text to the generated personalized video. The computing device may generate, based on the preset text parameters, a configuration file. The configuration file may include text parameters describing scale, position, rotation, color, and number of lines of a text on each frame in the personalized video. The computing device may receive, from a user, an input text to be added to the personalized video. The computing device may render the input text on each frame according to the text parameters in the configuration file. As a result, the input text may appear to be animated in the personalized video. The user may review the personalized video with the customized text in a full screen mode. While reviewing the personalized video, the user may change the input text with a new input text. The computing device can automatically replace the input text in the personalized video while displaying the personalized video in the full screen mode. The user may send the personalized video, via a communication chat, to another user of another computing device. In some embodiments, the generating the personalized video with customized text messages can be integrated in a messenger.

According to one embodiment of the disclosure, an example method for template-based generation of personalized videos may include receiving a video template. The video template may include a sequence of frame images and preset text parameters defining an animation of a text. The method may continue with generating a configuration file based on the text and the preset text parameters. The configuration file may include text parameters defining rendering the text for each of the frame images. The method may further include receiving an input text and rendering an output video based on the configuration file. The output video may have the sequence of frame images featuring the input text rendered according to the text parameters. The output video may be sent to a further computing device via a communication chat.

According to one embodiment of the disclosure, a system for generating personalized videos with customized text messages is disclosed. The system may include at least one processor and a memory storing processor-executable codes. The at least one processor may be configured to receive a video template. The video template may include a sequence of frame images and preset text parameters defining an animation of a text. The preset text parameters may describe visual effects applied to the text and include a font of the text, a color of the text, and a position of the text in at least one of the frame images. The visual effects may include a letter animation of appearance, displaying the text along a path, displaying copies of the text, a compression of the text, slicing of the text, a directional appearance of the text, a randomized letter appearance, a distortion and scaling of the text, a gradient fill of the text, adding a shadow and a glow to the text, adding a directional glow to the text, a flash appearance of the text, adding a perspective shadow to the text, applying a dynamic glow to the text, displaying a distorted shadow or an outline of the text, outlining the text, applying colored font assets to the text, and so forth.

The processor may be further configured to generate a configuration file based on the text and the preset text parameters. The configuration file may include text parameters defining rendering the text for each of the frame images. The text parameters may include a scale of the text, a position of the text in at least one frame image of the frame images, a rotation of the text, a color of the text, a number of lines of the text, a maximum length of the text, and so forth. The scale may be adjusted based on a global scale. The global scale may be determined to fit the input text into bounds of the frame images in the sequence. The processor may be further configured to receive an input text and render an output video comprising the sequence of frame images featuring the input text rendered according to the text parameters. The rendering may be performed based on the configuration file. The processor may be further configured to send the output video to a further computing device via a communication chat. The rendering may be performed by generating glyphs of the input text based on the configuration file and generating a layer including the glyphs. The rendering may further include splitting the input text into the number of lines. The at least one processor may be further configured to play back the output video in a full screen mode prior to sending the output video. While displaying the output video, the user may be provided with an option to change the input text to a further input text and the input text may be dynamically changed in the displayed output video with the further input text.

According to one example embodiment, a method for generating personalized videos with customized text messages is disclosed. The method may commence with receiving a video template. The video template may include a sequence of frame images and preset text parameters defining an animation of a text. The preset text parameters may describe visual effects applied to the text and include a font of the text, a color of the text, and a position of the text in at least one of the frame images. The visual effects may include a letter animation of appearance, displaying the text along a path, displaying copies of the text, a compression of the text, slicing of the text, a directional appearance of the text, a randomized letter appearance, a distortion and scaling of the text, a gradient fill of the text, adding a shadow and a glow to the text, adding a directional glow to the text, a flash appearance of the text, adding a perspective shadow to the text, applying a dynamic glow to the text, displaying a distorted shadow or an outline of the text, outlining the text, applying colored font assets to the text, and so forth. The method may continue with generating a configuration file based on the text and the preset text parameters. The configuration file may include text parameters defining rendering the text for each of the frame images. The text parameters may include a scale of the text, a position of the text in at least one frame image of the frame images, a rotation of the text, a color of the text, a number of lines of the text, a maximum length of the text, and so forth. The scale may be adjusted based on a global scale. The global scale may be determined to fit the input text into bounds of the frame images in the sequence. The method may further include receiving an input text and rendering an output video comprising the sequence of frame images featuring the input text rendered according to the text parameters. The rendering may be performed based on the configuration file. The method may continue with sending the output video to a further computing device via a communication chat. The rendering may be performed by generating glyphs of the input text based on the configuration file and generating a layer including the glyphs. The rendering may further include splitting the input text into the number of lines. The method may optionally include playing back the output video in a full screen mode prior to sending the output video. While displaying the output video, the user may be provided with an option to change the input text to a further input text and the input text may be dynamically changed in the displayed output video with the further input text.

According to yet another aspect of the disclosure, there is provided a non-transitory processor-readable medium, which stores processor-readable instructions. When the processor-readable instructions are executed by a processor, they cause the processor to implement the above-mentioned method for generating personalized videos with customized text messages.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

Referring now to the drawings, example embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for generating personalized videos with customized text messages can be practiced. The environment 100 may include a computing device 105, a user 102, a computing device 110, a user 104, a network 120, and messenger services system 130. The computing device 105 and computing device 110 can refer to a mobile device such as a mobile phone, smartphone, or tablet computer. In further embodiments, however, the computing device 110 can refer to a personal computer, laptop computer, netbook, set top box, television device, multimedia device, personal digital assistant, game console, entertainment system, infotainment system, vehicle computer, or any other computing device.

The computing device 105 and the computing device 110 can be communicatively connected to the messenger services system 130 via the network 120. The messenger services system 130 can be implemented as a cloud-based computing resource(s). The messenger services system can include computing resource(s) (hardware and software) available at a remote location and accessible over a network (e.g., the Internet). The cloud-based computing resource(s) can be shared by multiple users and can be dynamically re-allocated based on demand. The cloud-based computing resources can include one or more server farms/clusters including a collection of computer servers which can be co-located with network switches or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, and so forth.

In some embodiments of the disclosure, the computing device 105 can be configured to enable a communication chat between the user 102 and the user 104 of the computing 110. The user 102 and the user 104 may exchange text message and videos during the communication chat. The videos may include personalized videos. The personalized videos can be generated based on pre-generated video templates stored in the computing device 105 or the computing device 110. In some embodiments, the pre-generated video templates can be stored in the messenger services system 130 and downloaded to the computing device 105 or the computing device 110 on demand.

The messenger services system 130 may include a system 140 for pre-processing videos. The system 140 may generate video templates based on animation videos or live action videos. The messenger services system 130 may include a video templates database 145 for storing the video templates. The video templates can be downloaded to the computing device 105 or the computing device 110.

The messenger services system 130 may be also configured to store user profiles. The user profiles may include images of the face of the user 102, images of the face of the user 104, and images of faces of other persons. The images of the faces can be downloaded to the computing device 105 or the computing device 110 on demand and based on permissions. Additionally, the images of the face of the user 102 can be generated using the computing device 105 and stored in a local memory of the computing device 105. The images of the faces can be generated based on other images stored in the computing device 105. The images of the faces can be further used by the computing device 105 to generate personalized videos based on the pre-generated video templates. Similarly, the computing device 110 may be used to generate images of the face of the user 104. The images of the face of the user 104 can be used to generate personalized videos on the computing device 110. In further embodiments, the images of the face of user 102 and images of the face of the user 104 can be mutually used to generate personalized videos on the computing device 105 or the computing device 110.

In some embodiments, a pre-generated video template may include a preset default text message. The pre-generated video templates may further include preset text parameters for an animation of the preset default text message in a personalized video generated based on the pre-generated video template. The computer device can be configured to play back the personalized video featuring the preset text message animated based on the preset text parameters. During the playback of the personalized video, the computing device 105 may provide an option to change the preset default text message and parameters for displaying the text message in the personalized video. The computing device 105 may dynamically change the preset default text message in the personalized video while the personalized video is played back. The user 105 may further send the personalized video with the changed text message to the user 104 of the computing device 110 via a communication chat.

In an example embodiment, the text in the text message can be automatically translated if the user 104 is using a language different from the language of the user 102 in the communication chat. Thus, in the communication chat, the user 104 may see the personalized video with the text message displayed in the language used by the user 104.

Figure 2:
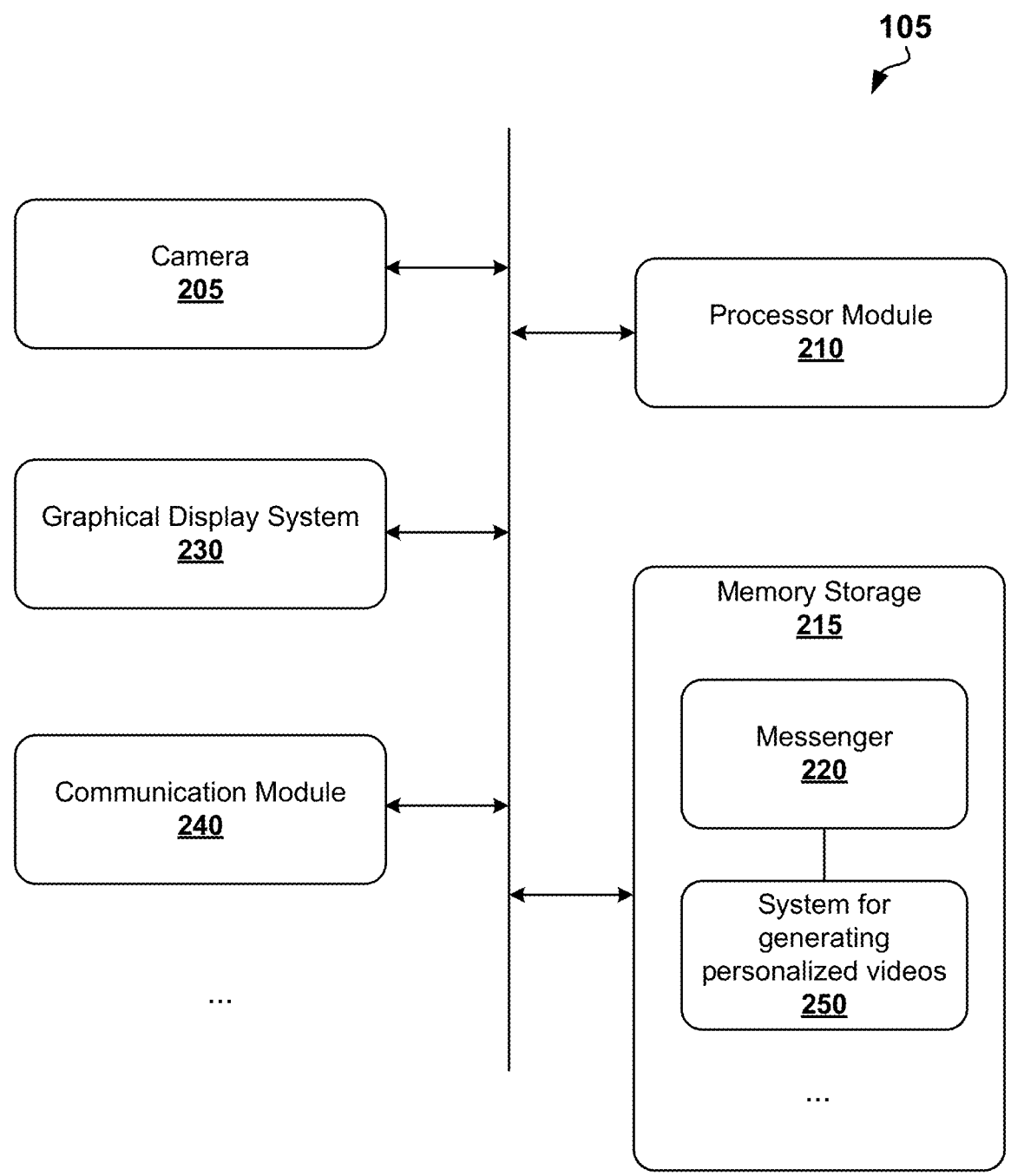
FIG. 2 is a block diagram showing an example embodiment of a computing device for implementing methods for generating personalized videos with customized text messages.

FIG. 2 is a block diagram showing an example embodiment of a computing device 105 (or computing device 110) for implementing methods for generating personalized videos with customized text messages. In the example shown in FIG. 2, the computing device 110 includes both hardware components and software components. Particularly, the computing device 110 includes a camera 205 or any other image-capturing device or scanner to acquire digital images. The computing device 110 can further include a processor module 210 and a storage module 215 for storing software components and processor-readable (machine-readable) instructions or codes, which, when performed by the processor module 210, cause the computing device 105 to perform at least some steps of methods for generating personalized videos with customized text messages as described herein. The computing device 105 may include graphical display system 230 and a communication module 240. In other embodiments, the computing device 105 may include additional or different components. Moreover, the computing device 105 can include fewer components that perform functions similar or equivalent to those depicted in FIG. 2.

The computing device 110 can further include a messenger 220 for enabling communication chats with another computing device (such as the computing device 110) and a system 250 for generating personalized videos. The system 250 is described in more detail below with reference to FIG. 4. The messenger 220 and the system 250 may be implemented as software components and processor-readable (machine-readable) instructions or codes stored in the memory storage 215, which when performed by the processor module 210, cause the computing device 105 to perform at least some steps of methods for providing communication chats and generation of personalized videos as described herein.

In some embodiments, the system 250 for generating personalized videos can be integrated in the messenger 220. A user interface of the messenger 220 and the system 400 for template-based personalized videos can be provided via the graphical display system 230. The communication chats can be enabled via the communication module 240 and the network 120. The communication module 240 may include a GSM module, a WiFi module, a Bluetooth™ module and so forth.

Figure 3:
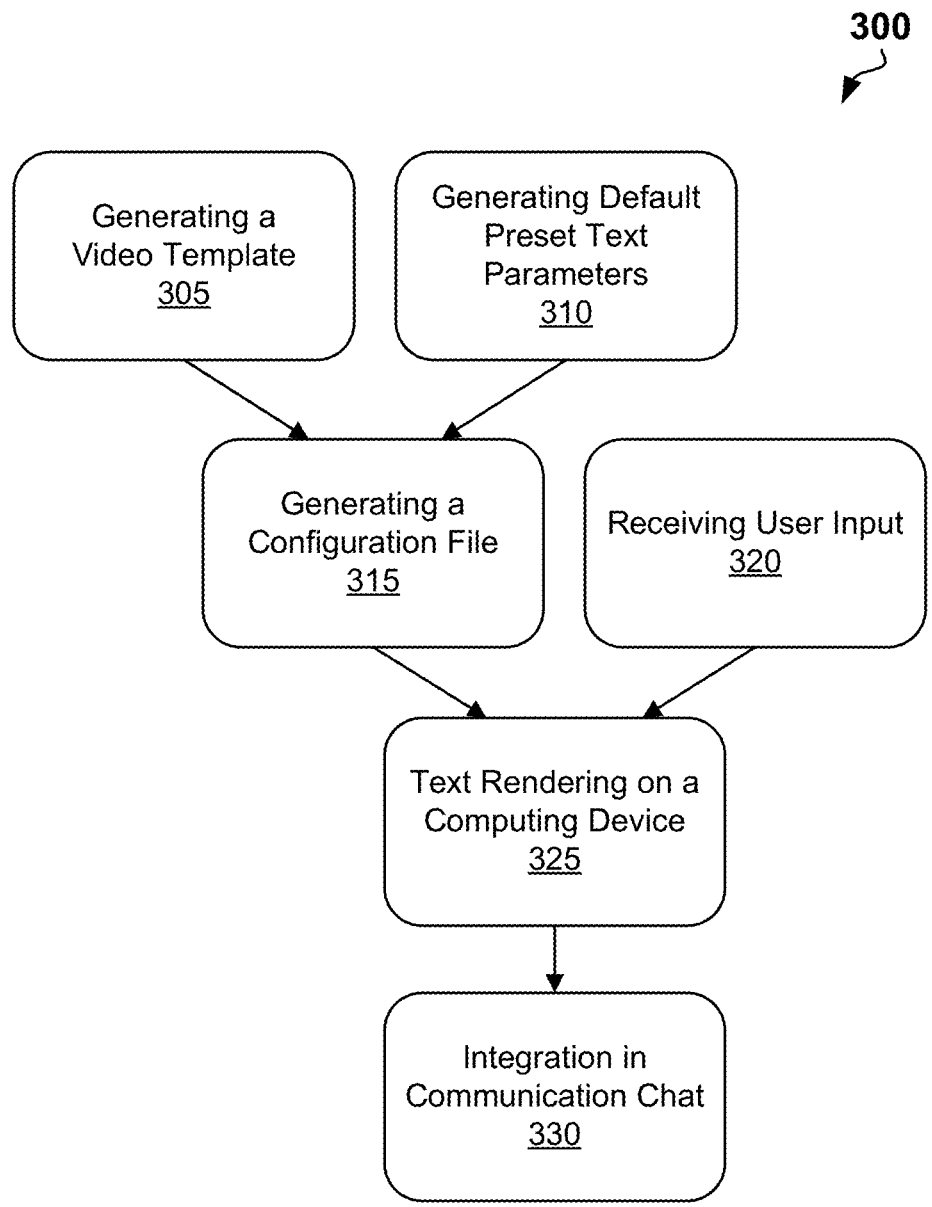
FIG. 3 is a flow chart showing a process for generating personalized videos with customized text messages, according to some example embodiments of the disclosure.

FIG. 3 is a flow chart showing steps of a process 300 for generating personalized videos with customized text messages, according to some example embodiment of the disclosure. The process 300 may include generating a video template 305, generating default preset text parameters 310, generating a configuration file 315, receiving a user input 320, text rendering on a computing device 325, and integration in a communication chat 330. The generating of a video template 305 and the generating of default preset text parameters 310 can be performed by the system 140 for pre-processing videos in the messenger services system 130 (shown in FIG. 1). The generating of a configuration file 315, receiving of a user input 320, text rendering on a computing device 325 can be performed on a computing device 105 (shown in FIG. 1). The generation of the configuration file 315 can also be performed by the system 140.

The generating of the video template 305 may include creation of a customized personalized video that is described in more detail in U.S. patent application Ser. No. 16/661,086 dated Oct. 23, 2019, titled "SYSTEMS AND METHODS FOR TEMPLATE-BASED GENERATION OF PERSONALIZED VIDEOS". The customized personalized videos may have face reenactment suitable for any situation where personalized videos can be used.

The configuration file 315 includes parameters associated with positioning the input text on the video template. The default preset text parameters may employ various instruments for artistic text animation, describe a font (any existing font may be used or a new font may be created), a color or animated texture, shadows and outlines, and other effects, including, but not limited to, letter appearance animation, text on a path, same text copies, text compression, text slicing, word appearance, directional appearance, randomized letter appearance, text box distortion/scaling, gradient fill, shadow and glow, directional glow, flash appearance, perspective shadow, dynamic glow, distorted shadow/outline, outline text, colored font assets, 3D stroke effect, dynamic outline, masked video or texture, masked effects on random letter parts, visual effects anchored to text box/letter, 3D text, blur, glitch, and so forth. The preset text parameters may have some constant parameters, which are fixed, and some template parameters configured later for each personalized video.

The generating of a configuration file 315 may include creating a configuration file for each customized personalized video. The configuration file may describe a scale, position, rotation, and color of the text on each frame; a number of lines and maximum length; selected preset text parameters and template parameters for all features used in the preset text parameters, and so forth. The configuration file may be generated on a computing device or, optionally, in a cloud. The generation of the configuration file 315 can also be performed by the system 140.

The text rendering on a computing device 325 may include five steps, in some example embodiments. The first step is splitting the text into multiple lines, if necessary. The second step includes generation of glyphs with predefined size and font. A global text scale may be selected on the third step in order to fit text into required bounds in all frames. The fourth step may include pre-rendering layers with glyphs, outlines, and shadows (may be performed on the computing device). On the fifth step, prepared layers are rendered based on the predefined parameters. The rendering may be performed on the computing device using a graphics processing unit (GPU), with the help of graphics libraries like OpenGL, Metal, or Vulkan. In some embodiments, the rendering of the customized personalized video with text may be performed remotely, i.e., on a server or in a cloud.

The integration in a communication chat 330 may include integrating of the personalized video into the communication chat by adding inputted text to the personalized video and sending the personalized video as an encoded video. When the user inputs the text, a sticker icon may change to a user face icon, and when the user goes to the keyboard, the user may see small previews of personalized videos generated with given text. The user may then send the personalized video in a full screen mode into the communication chat. The image of the user face used in the creation of the personalized video may be bound to the account of the user that is a sender of the personalized video and can be used by other users if allowed by privacy settings of the user for his image of the user face. When using a communication chat, the user can also create personalized videos with the face of the other users with whom the user is chatting. It is also possible to allow the user to use any image with a face from a picture gallery stored on the computing device of the user or uploaded from the Internet.

Users may view the generated previews of customized personalized videos with the text in a full screen mode before sending. Furthermore, a tool for changing text while viewing the personalized video in the full screen mode may be provided. The users may further have the ability to change the text of the selected personalized video preview by tapping on a text button in an action bar. The users may have an option to export the generated personalized video in the form of an encoded video or a graphics interchange format (GIF) file.

In an example embodiment, the user may have access to an interface that allows to customize personalized videos not only by adding text and changing parameters of the text, but also by selecting other parameters, such as text color, location, and so forth; adding effects and transitions, footages, music, and sounds; changing background; changing gender/clothes of the actor in the personalized video, choosing a character; changing artistic style; and so forth. The user may select the parameters of the text from the previously created list or by providing to the user the necessary information in response to a search query of the user. In some embodiments, links, hashtags, or geolocation may be additionally added to the personalized videos.

Figure 4:
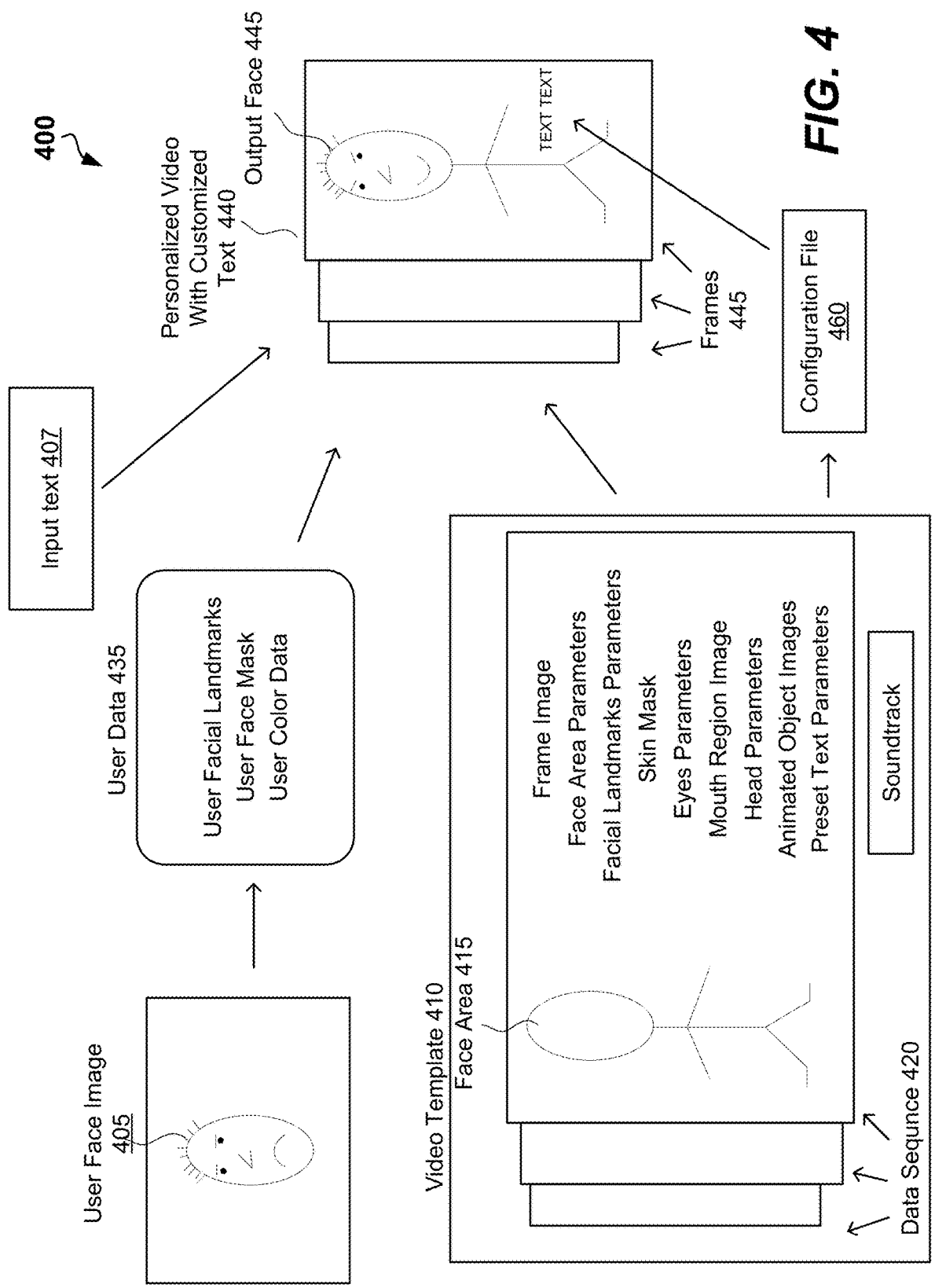
FIG. 4 is a flow chart showing functionality of a system for generating personalized videos with customized text messages, according to some example embodiment of the disclosure.

FIG. 4 is a schematic showing functionality 400 of the system 250 for generating personalized videos, according to some example embodiments. The system 250 may receive a user face image 405, a video template 410, and an input text 407. The video template 410 may include a sequence of frame images. The video template 410 may further include, for each of the frame images, face area parameters, facial landmark parameters, skin mask, eyes parameters, mouth region image, head parameters, animated object images, and preset text parameters. The video template 410 may further include a soundtrack.

The sequence of the frame images can be generated based on a live action video or an animated video. The face area parameters may include coordinates of a position of a face area within the frame images. The facial landmark parameters can be generated based on a live action video featuring a face of a facesync actor. The facial landmark parameters may include coordinates of facial landmarks on the face of the facesync actor, such as points around an oval of the face, points around lips and nose, and points around eyebrows and eyelids. Eyes parameters may include coordinates of a position of an iris in sclera of the facesync actor. A mouth region image may include an image of a mouth region of the face of the facesync actor. The skin mask may be generated based on a live video featuring a body of an actor or a skin area of 2D/3D animation of a body. The skin mask may define a skin area of the body of the actor. In an example embodiment, the skin mask and the facial landmark parameters can be generated based on two different live action videos capturing different actors (referred to herein as an actor and a facesync actor, respectively). It should be noted that multiple actors are not required and, in some embodiments, only one actor can be used.

Preset text parameters may define an animation of a text. The preset text parameters may describe visual effects applied to the text. The visual effects may include one or more of the following: a letter animation of an appearance, displaying the text along a path, displaying copies of the text, compression of the text, slicing of the text, a directional appearance of the text, a randomized letter appearance, a distortion and scaling of the text, gradient fill of the text, adding a shadow and a glow to the text, adding directional glow to the text, a flash appearance of the text, adding a perspective shadow to the text, applying a dynamic glow to the text, displaying a distorted shadow or an outline of the text, outlining the text, applying colored font assets to the text, and so forth. Preset text parameters may also include a default text to be animated. In some embodiments, the localization of the text may be performed. Specifically, the localization of the text may be performed by adding translations of the default text for each personalized video in a configuration file.

The system 250 may determine, based on the user face image 405, user data 435. The user data may include user facial landmark, user face mask, and user color data.

The system 250 may generate, based on the user data 435 and data sequences 420, frames 445 of a personalized video 440. The personalized video 440 may be generated in the form of an audiovisual media (e.g., a video, an animation, or any other type of media) that features a face of a user or faces of multiple users. The personalized video 440 can be generated based on a pre-generated video template. A video template may include video configuration data. The video configuration data may include a sequence of frame images, a sequence of face area parameters defining positions of a face area in the frame images, and a sequence of facial landmark parameters defining positions of facial landmarks in the frame images. Each of the facial landmark parameters may correspond to a facial expression of a facesync actor. The pre-generated video templates can be stored remotely in a cloud-based computing resource and can be downloadable by a user of a computing device (such as a smartphone). The user of the computing device may capture, by the computing device, an image of a face or select an image of the face from a camera roll. The computing device may further generate a personalized video based on the image of the face and one of the pre-generated video templates. The generation of the personalized video may include modifying a frame image of the sequence of frame images. The modification of the frame image may include modifying the image of the source face to obtain a further image featuring the source face adopting a facial expression corresponding to the facial landmark parameters and inserting the further image into the frame image at a position determined by face area parameters corresponding to the frame image. The image of the source face may be modified based on facial landmark parameters corresponding to the frame image. The system 250 may further add the soundtrack to the personalized video 440.

The system 250 may generate, based on the preset text parameters, configuration file 460. The generation of the configuration file 315 can also be performed by the system 140. The configuration file 460 may include text parameters defining rendering the text for each of the frame images. The text parameters may include a scale of the text, a position of the text in at least one frame image of the frame images, a rotation of the text, a color of the text, a number of lines of the text, a maximum length of the text, and so forth.

The system 250 may render, based on the configuration file, an output video comprising the sequence of frame images 445 featuring the input text 407 rendered according to the text parameters. The rendering the input text may include generating glyphs of the input text based on the configuration file and generating a layer including the glyphs.

Figure 5:
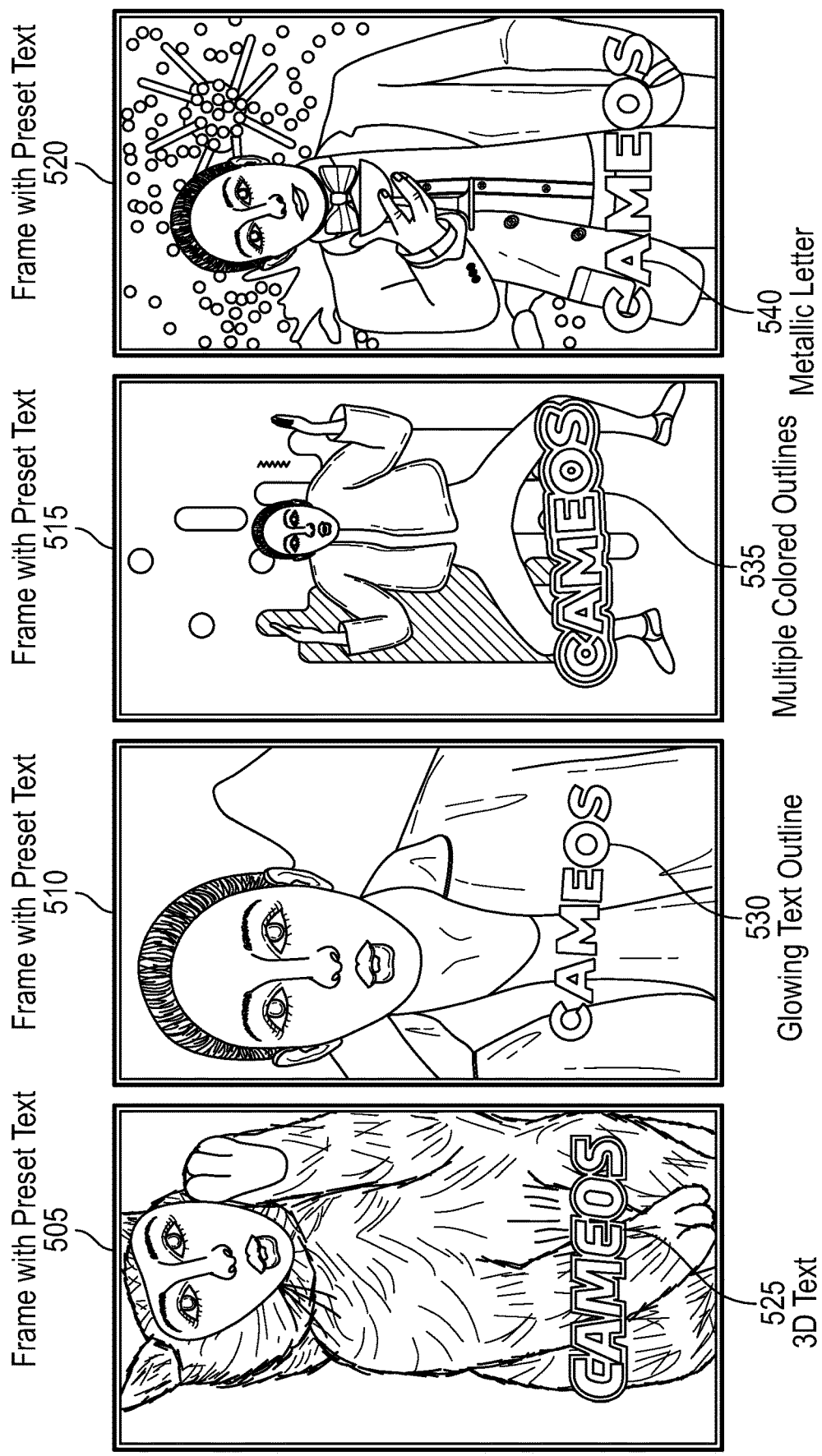
FIG. 5 shows example frames with text rendered based on preset text parameters, according to some example embodiments.

FIG. 5 shows example frames with text rendered based on preset text parameters, according to some example embodiments. FIG. 5 shows a frame 505 with preset text where the text is 3D text 525. FIG. 5 further shows a frame 510 with preset text where the text is surrounded with glowing text outline 530. FIG. 5 further shows a frame 515 with preset text where the text is surrounded with multiple colored outlines 535. FIG. 5 shows a frame 520 with preset text where the text is shown by metallic letters 540.

Figure 6:
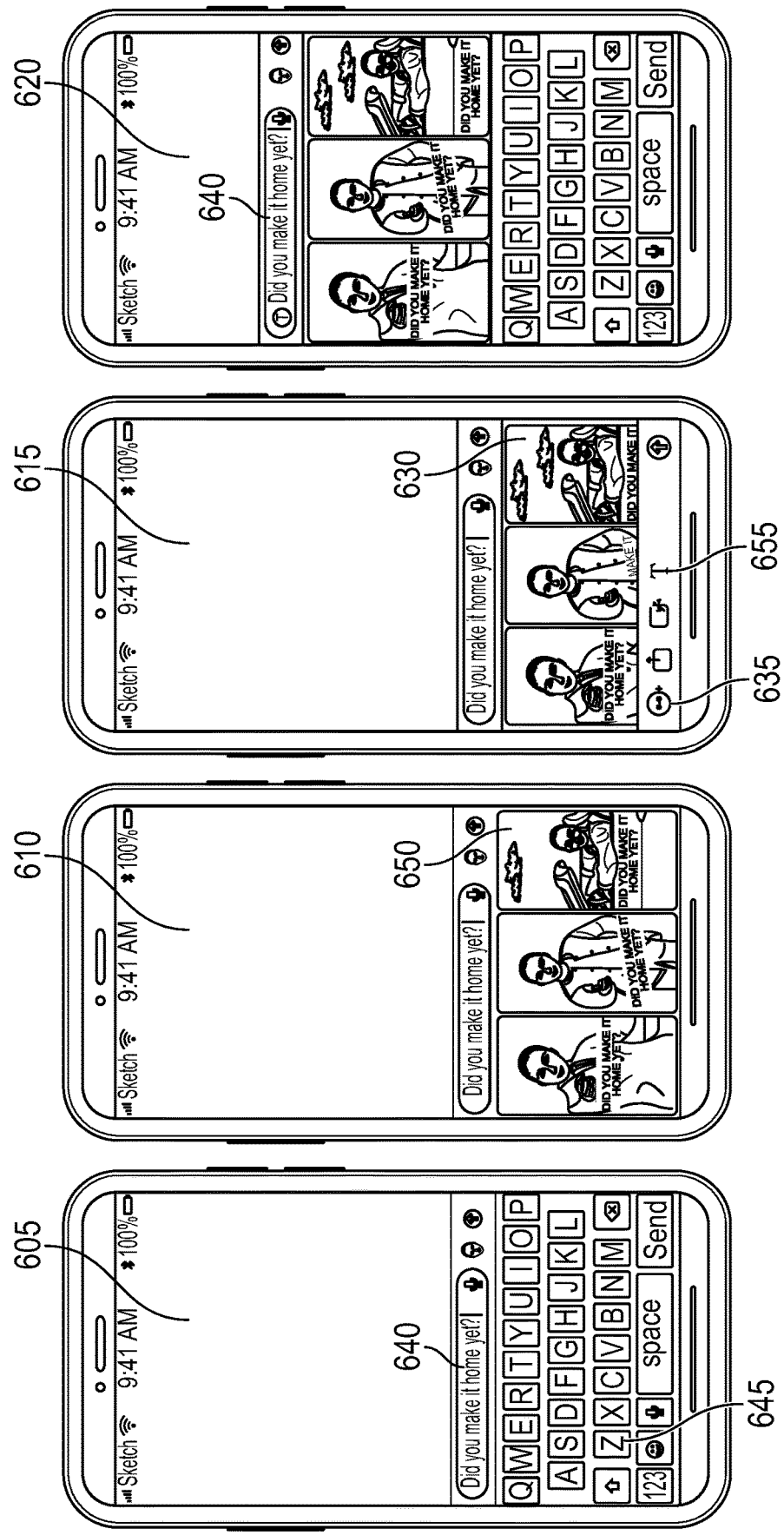
FIGS. 6-7 show example screens of a communication chat, in which systems and methods for generating personalized videos with customized text messages can be implemented, according to some example embodiments.
Figure 7:
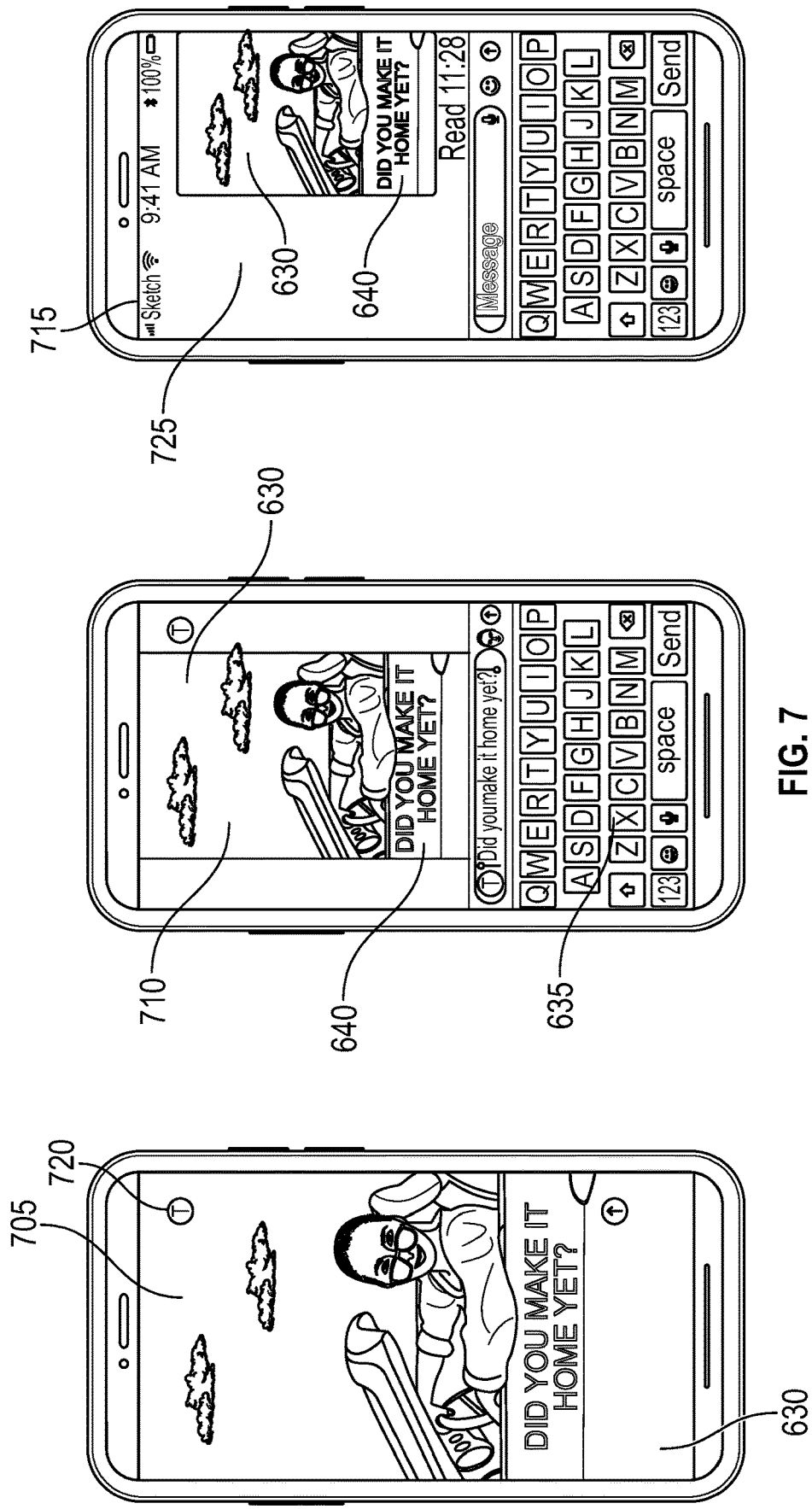

FIGS. 6-7 show example screens of a communication chat, wherein systems and methods for generating personalized videos with customized text messages can be implemented. FIG. 6 shows a user interface 605 with user input 640 and a keyboard 645. FIG. 6 further shows a user interface 610 with a list 650 of personalized videos. A user interface 615 shows an action bar 635, one selected personalized video 630, and a change text button 655. A user interface 620 shows that the user may change the text 640 upon pressing the change text button 655 when the personalized video 630 is selected.

FIG. 7 shows a user interface 705 that shows the personalized video 630 in a full screen mode. The user interface 705 may have a change text button 720 to enable the user to change the text 640 in the personalized video 630. A user interface 710 shows the process of changing the text 640 via the keyboard 645 when the personalized video 630 is in the full screen mode. A user interface 715 shows the personalized video 630 having the text 640 and sent to a communication chat 725.

FIG. 8 shows example frames of a personalized video customized by changing a background, according to an example embodiment. The user may select a background of the personalized video by selecting an image of the user or any other photo or video material. For better visual presentation, the background of such customized personalized video may be transparent. FIG. 8 shows a frame 805 of the personalized video 820 with the background created based on a user image 825. A user interface 810 is a gallery 830 of customized personalized videos. FIG. 8 further shows a frame 815 of the personalized video 835 with the background created based on a user image 840. The user may further add text to the personalized videos 820 and 835.

Figure 9:
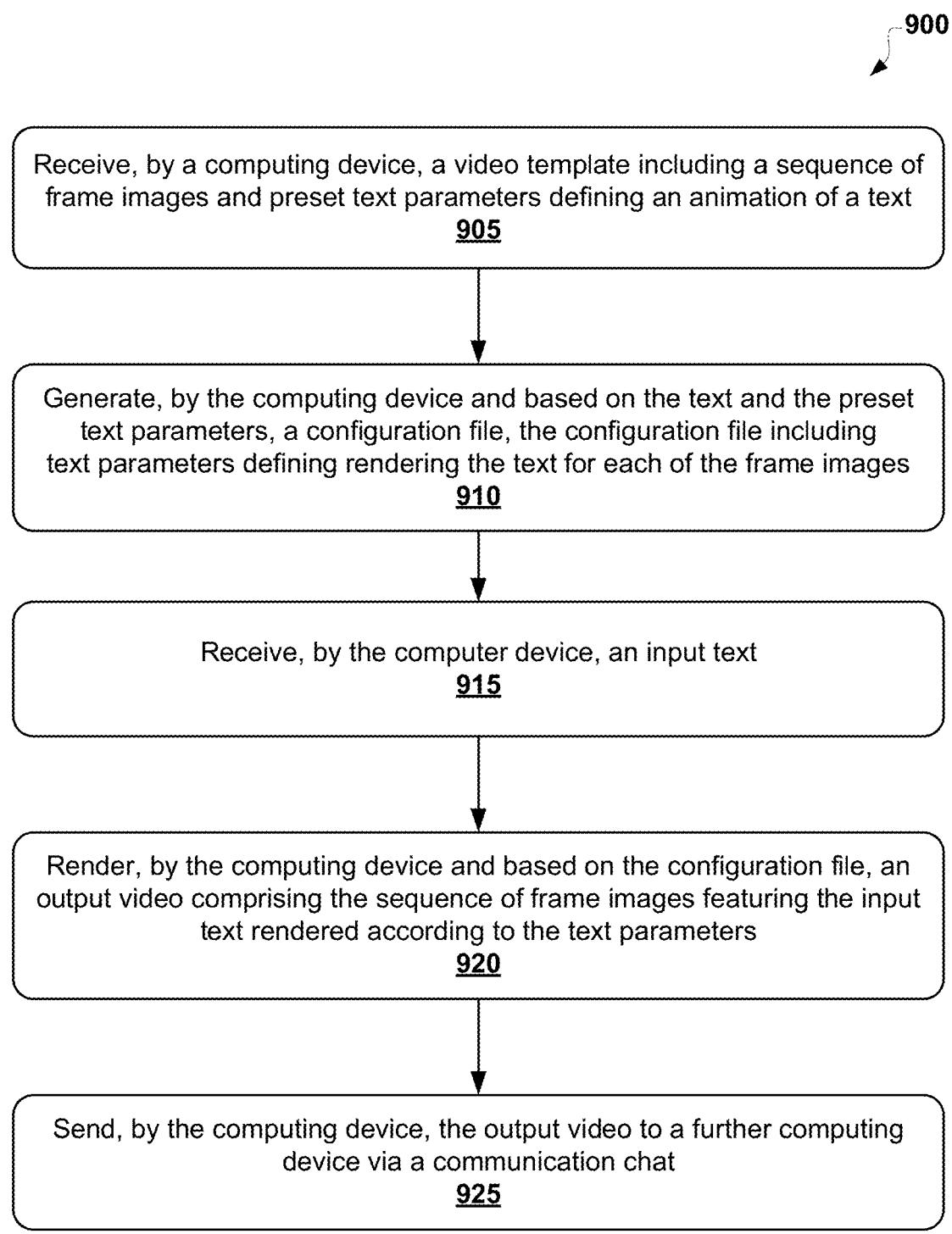
FIG. 9 is a flow chart showing a method for generating personalized videos with customized text messages, in accordance with an example embodiment.

FIG. 9 is a flow chart showing a method 900 for generating personalized videos with customized text messages, according to some example embodiments of the disclosure.

The method 900 can be performed by the computing device 105. The method 900 may commence with receiving a video template at step 905. The video template may include a sequence of frame images and preset text parameters defining an animation of a text. The preset text parameters may describe visual effects applied to the text and include a font of the text, a color of the text, and a position of the text in at least one of the frame images. The visual effects may include a letter animation of appearance, displaying the text along a path, displaying copies of the text, a compression of the text, slicing of the text, a directional appearance of the text, a randomized letter appearance, a distortion and scaling of the text, a gradient fill of the text, adding a shadow and a glow to the text, adding a directional glow to the text, a flash appearance of the text, adding a perspective shadow to the text, applying a dynamic glow to the text, displaying a distorted shadow or an outline of the text, outlining the text, applying colored font assets to the text, and so forth. At step 910, the method 900 may continue with generating a configuration file based on the text and the preset text parameters. The configuration file may include text parameters defining rendering the text for each of the frame images. The text parameters may include a scale of the text, a position of the text in at least one frame image of the frame images, a rotation of the text, a color of the text, a number of lines of the text, a maximum length of the text, and so forth. The scale may be adjusted based on a global scale. The global scale may be determined to fit the input text into bounds of the frame images in the sequence. The method 900 may further include receiving an input text at step 915 and rendering an output video at step 920. The output video may include the sequence of frame images featuring the input text rendered according to the text parameters. The rendering may be performed based on the configuration file. The method 900 may continue with sending the output video to a further computing device via a communication chat at step 925. The rendering may be performed by generating glyphs of the input text based on the configuration file and generating a layer including the glyphs. The rendering may further include splitting the input text into the number of lines. The method may optionally include playing back the output video in a full screen mode prior to sending the output video. While displaying the output video, the user may be provided with an option to change the input text to a further input text and the input text may be dynamically changed in the displayed output video with the further input text.

Figure 10:
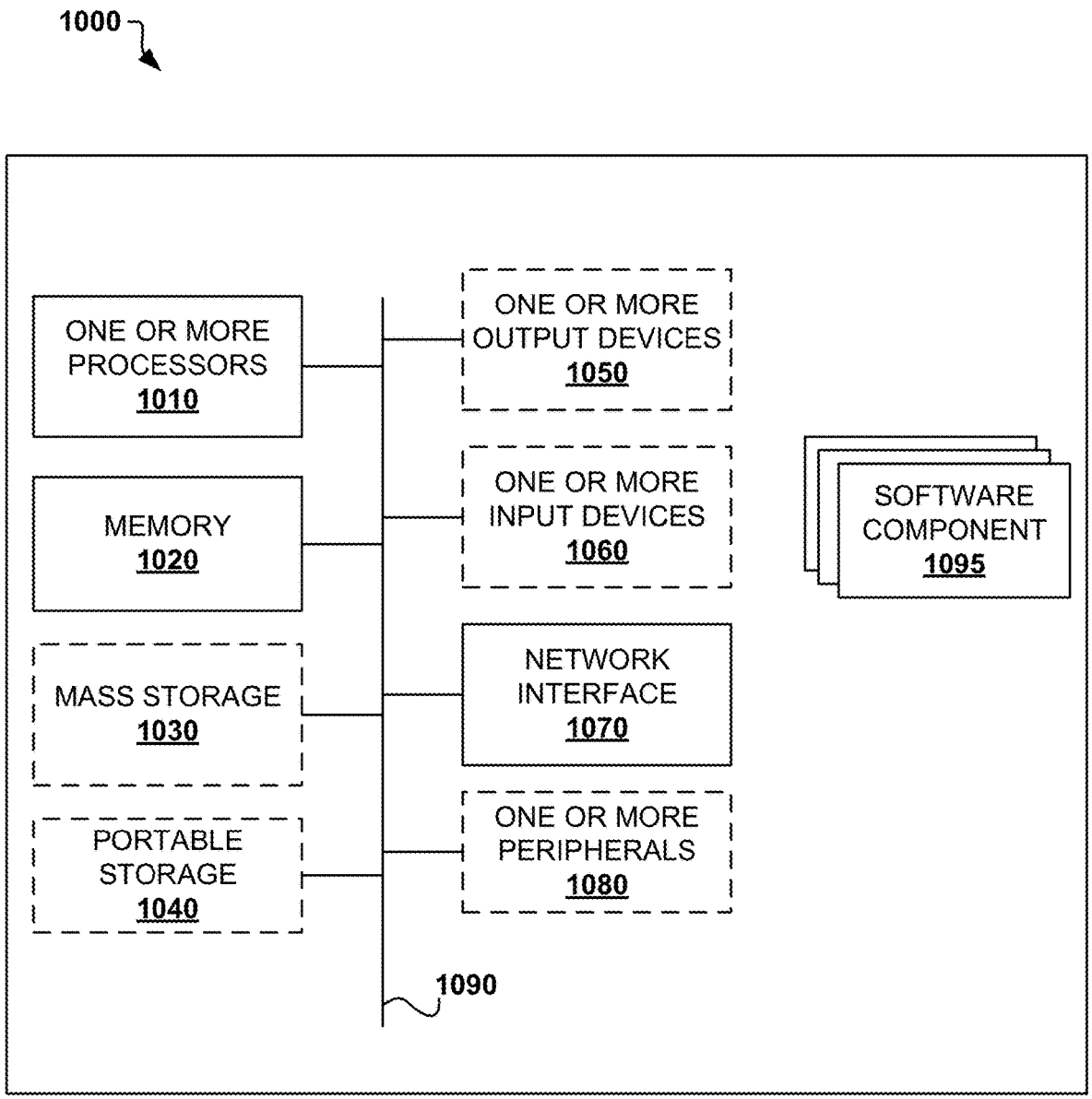
FIG. 10 shows an example computer system that can be used to implement methods for generating personalized videos with customized text messages.

FIG. 10 illustrates an example computing system 1000 that can be used to implement methods described herein. The computing system 1000 can be implemented in the contexts of the likes of computing devices 105 and 110, the messenger services system 130, the messenger 220, and the system 250 for generating of personalized videos.

As shown in FIG. 10, the hardware components of the computing system 1000 may include one or more processors 1010 and memory 1020. Memory 1020 stores, in part, instructions and data for execution by processor 1010. Memory 1020 can store the executable code when the system 1000 is in operation. The system 1000 may further include an optional mass storage device 1030, optional portable storage medium drive(s) 1040, one or more optional output devices 1050, one or more optional input devices 1060, an optional network interface 1070, and one or more optional peripheral devices 1080. The computing system 1000 can also include one or more software components 1095 (e.g., ones that can implement the method for providing personalized videos as described herein).

The components shown in FIG. 10 are depicted as being connected via a single bus 1090. The components may be connected through one or more data transport means or data network. The processor 1010 and memory 1020 may be connected via a local microprocessor bus, and the mass storage device 1030, peripheral device(s) 1080, portable storage device 1040, and network interface 1070 may be connected via one or more input/output (I/O) buses.

The mass storage device 1030, which may be implemented with a magnetic disk drive, solid-state disk drive, or an optical disk drive, is a non-volatile storage device for storing data and instructions for use by the processor 1010. Mass storage device 1030 can store the system software (e.g., software components 1095) for implementing embodiments described herein.

Portable storage medium drive(s) 1040 operates in conjunction with a portable non-volatile storage medium, such as a compact disk (CD), or digital video disc (DVD), to input and output data and code to and from the computing system 1000. The system software (e.g., software components 1095) for implementing embodiments described herein may be stored on such a portable medium and input to the computing system 1000 via the portable storage medium drive(s) 1040.

The optional input devices 1060 provide a portion of a user interface. The input devices 1060 may include an alphanumeric keypad, such as a keyboard, for inputting alphanumeric and other information, or a pointing device, such as a mouse, a trackball, a stylus, or cursor direction keys. The input devices 1060 can also include a camera or scanner. Additionally, the system 1000 as shown in FIG. 10 includes optional output devices 1050. Suitable output devices include speakers, printers, network interfaces, and monitors.

The network interface 1070 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1070 may be a network interface card, such as an Ethernet card, optical transceiver, radio frequency transceiver, or any other type of device that can send and receive information. The optional peripherals 1080 may include any type of computer support device to add additional functionality to the computer system.

The components contained in the computing system 1000 are intended to represent a broad category of computer components. Thus, the computing system 1000 can be a server, personal computer, hand-held computing device, telephone, mobile computing device, workstation, minicomputer, mainframe computer, network node, or any other computing device. The computing system 1000 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for generating personalized videos with customized text messages have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for generating personalized videos, the method comprising:
    receiving, by at least one computing device, an input text and a video template, the video template including a sequence of frame images and text parameters defining an animation of the input text for the sequence of frame images;
    playing back, by the at least one computing device and based on the video template, an output video, the output video including the sequence of frame images featuring the input text animated according to the text parameters;
    while playing back the output video, providing, by the at least one computing device, a user with an option to change at least one text parameter of the text parameters;
    upon receiving an indication that the user has changed the at least one text parameter, dynamically changing, in the output video, by the at least one computing device, the animation of the input text according to the at least one text parameter; and
    providing, by the at least one computing device, the output video to at least one further computing device via a communication chat.

2. The method of claim 1, wherein the text parameters are pre-generated based on a default text.

3. The method of claim 1, wherein the option to change the at least text parameter is provided while the output video is played back in a full screen mode.

4. The method of claim 1, wherein the at least text parameter includes one or more of the following: a font of the input text, a size of the input text, a color of the input text, and a position of the input text.

5. The method of claim 1, further comprising, prior to the providing the output video to the at least one further computing device, adding, to the output video, one or more of the following: a geolocation information, a hashtag, and a link.

6. The method of claim 1, wherein the providing the user with the option to change at least one text parameter includes enabling the user to select the option from a list of options.

7. The method of claim 1, further comprising, prior to the providing the output video to the at least one further computing device, providing the user with a user interface to change the input text to a further input text.

8. The method of claim 1, further comprising, prior to the providing the output video to the at least one further computing device, providing the user with a user interface to change a background of the output video.

9. The method of claim 1, further comprising, prior to the providing the output video to the at least one further computing device, providing the user with a user interface to change at least one clothe of an actor featured in the output video.

10. The method of claim 1, further comprising, prior to the providing the output video to the at least one further computing resource device, providing the user with a user interface to add a sound to the output video.

11. A system for generating personalized videos, the system comprising:
at least one processor and a memory storing processor-executable codes, wherein the at least one processor is configured to implement the following operations upon executing the processor-executable codes:
receiving, by at least one computing device, an input text and a video template, the video template including a sequence of frame images and text parameters defining an animation of the input text for the sequence of frame images;
playing back, by the at least one computing device and based on the video template, an output video, the output video including the sequence of frame images featuring the input text animated according to the text parameters;
while playing back the output video, providing, by the at least one computing device, a user with an option to change at least one text parameter of the text parameters;
upon receiving an indication that the user has changed the at least one text parameter, dynamically changing, in the output video, by the at least one computing device, the animation of the input text according to the at least one text parameter; and
providing, by the at least one computing device, the output video to at least one further computing device via a communication chat.

12. The system of claim 11, wherein the text parameters are pre-generated based on a default text.

13. The system of claim 11, wherein the option to change the at least text parameter is provided while the output video is played back in a full screen mode.

14. The system of claim 11, wherein the at least text parameter includes one or more of the following: a font of the input text, a size of the input text, a color of the input text, and a position of the input text.

15. The system of claim 11, wherein the at least one processor is configured to, prior to the providing the output video to the at least one further computing device, add, to the output video, one or more of the following: a geolocation information, a hashtag, and a link.

16. The system of claim 11, wherein the providing the user with the option to change at least one text parameter includes enabling the user to select the option from a list of options.

17. The system of claim 11, wherein the at least one processor is configured to, prior to the providing the output video to the at least one further computing device, provide the user with a user interface to change the input text to a further input text.

18. The system of claim 11, wherein the at least one processor is configured to, prior to the providing the output video to the at least one further computing device, provide the user with a user interface to change a background of the output video.

19. The system of claim 11, wherein the at least one processor is configured to, prior to the providing the output video to the at least one further computing device, provide the user with a user interface to change at least one clothe of an actor featured in the output video.

20. A non-transitory processor-readable medium having instructions stored thereon, which when executed by one or more processors, cause the one or more processors to implement a method for generating personalized videos, the method comprising:
receiving, by at least one computing device, an input text and a video template, the video template including a sequence of frame images and text parameters defining an animation of the input text for the sequence of frame images;
playing back, by the at least one computing device and based on the video template, an output video, the output video including the sequence of frame images featuring the input text animated according to the text parameters;
while playing back the output video, providing, by the at least one computing device, a user with an option to change at least one text parameter of the text parameters;
upon receiving an indication that the user has changed the at least one text parameter, dynamically changing, in the output video, by the at least one computing device, the animation of the input text according to the at least one text parameter; and
providing, by the at least one computing resource, the output video to at least one further computing device via a communication chat.

* * * * *